United States Patent
Graaf et al.

(10) Patent No.: US 10,710,433 B2
(45) Date of Patent: Jul. 14, 2020

(54) AC-SYSTEM WITH VERY HIGH COOLING CAPACITY

(71) Applicant: Hanon Systems, Daejeon (KR)

(72) Inventors: Marc Graaf, Krefeld (DE); Roman Heckt, Aachen (DE)

(73) Assignee: Hanon Systems, Daejeon (KR)

( * ) Notice: Subject to any disclaimer, the term of this patent is extended or adjusted under 35 U.S.C. 154(b) by 0 days.

(21) Appl. No.: 15/627,924

(22) Filed: Jun. 20, 2017

(65) Prior Publication Data

US 2018/0001737 A1    Jan. 4, 2018

(30) Foreign Application Priority Data

Jul. 1, 2016    (DE) .................. 10 2016 112 095

(51) Int. Cl.
*B60H 1/32* (2006.01)
*H01M 10/663* (2014.01)
*B60H 1/00* (2006.01)

(52) U.S. Cl.
CPC .......... *B60H 1/323* (2013.01); *B60H 1/00278* (2013.01); *B60H 1/3211* (2013.01); *B60H 1/32281* (2019.05); *H01M 10/663* (2015.04); *B60H 2001/00307* (2013.01); *B60H 2001/00928* (2013.01); *B60H 2001/00949* (2013.01); *H01M 2220/20* (2013.01)

(58) Field of Classification Search
CPC .. B60H 1/323; B60H 1/00278; B60H 1/3211; B60H 2001/00307; B60H 2001/00928; B60H 2001/00949; H01M 6/5038

USPC .......................................... 62/498, 239, 333
See application file for complete search history.

(56) References Cited

U.S. PATENT DOCUMENTS

| | | | |
|---|---|---|---|
| 7,228,707 B2 | 6/2007 | Lifson et al. | |
| 9,180,753 B2* | 11/2015 | Kim | B60H 1/00885 |
| 2005/0178523 A1* | 8/2005 | Itoh | B60H 1/00385 |
| | | | 165/42 |
| 2013/0026998 A1* | 1/2013 | Dyer | B60L 58/26 |
| | | | 320/150 |

(Continued)

FOREIGN PATENT DOCUMENTS

DE    102009002424 A1    1/2010

*Primary Examiner* — Joseph F Trpisovsky
(74) *Attorney, Agent, or Firm* — Norton Rose Fulbright US LLP

(57) ABSTRACT

System and method for operating the system for climatizing air of a passenger compartment and for heat exchange with drive components of motor vehicles includes a coolant circuit and refrigerant circuit with a compressor, a refrigerant-air heat exchanger, operated as condenser/gas cooler, at least one expansion element, at least one heat exchanger, operated as evaporator, for conditioning an air-mass flow supplied to the passenger compartment; this is implemented as refrigerant-air heat exchanger, and at least one heat exchanger, operated as evaporator, which is implemented as refrigerant-coolant heat exchanger and disposed within the coolant circuit for heat transfer from coolant to refrigerant. The refrigerant circuit includes a heat exchanger, operated as condenser/gas cooler, which acts as refrigerant-coolant heat exchanger and is disposed within the coolant circuit for heat transfer from refrigerant to coolant. The coolant circuit is implemented with at least one heat exchanger for heat exchange with a drive component.

18 Claims, 1 Drawing Sheet

(56) References Cited

U.S. PATENT DOCUMENTS

2013/0145781 A1 6/2013 Liu
2016/0001634 A1* 1/2016 Terada ............... B60H 1/00921
　　　　　　　　　　　　　　　　　　　　　　62/160

* cited by examiner

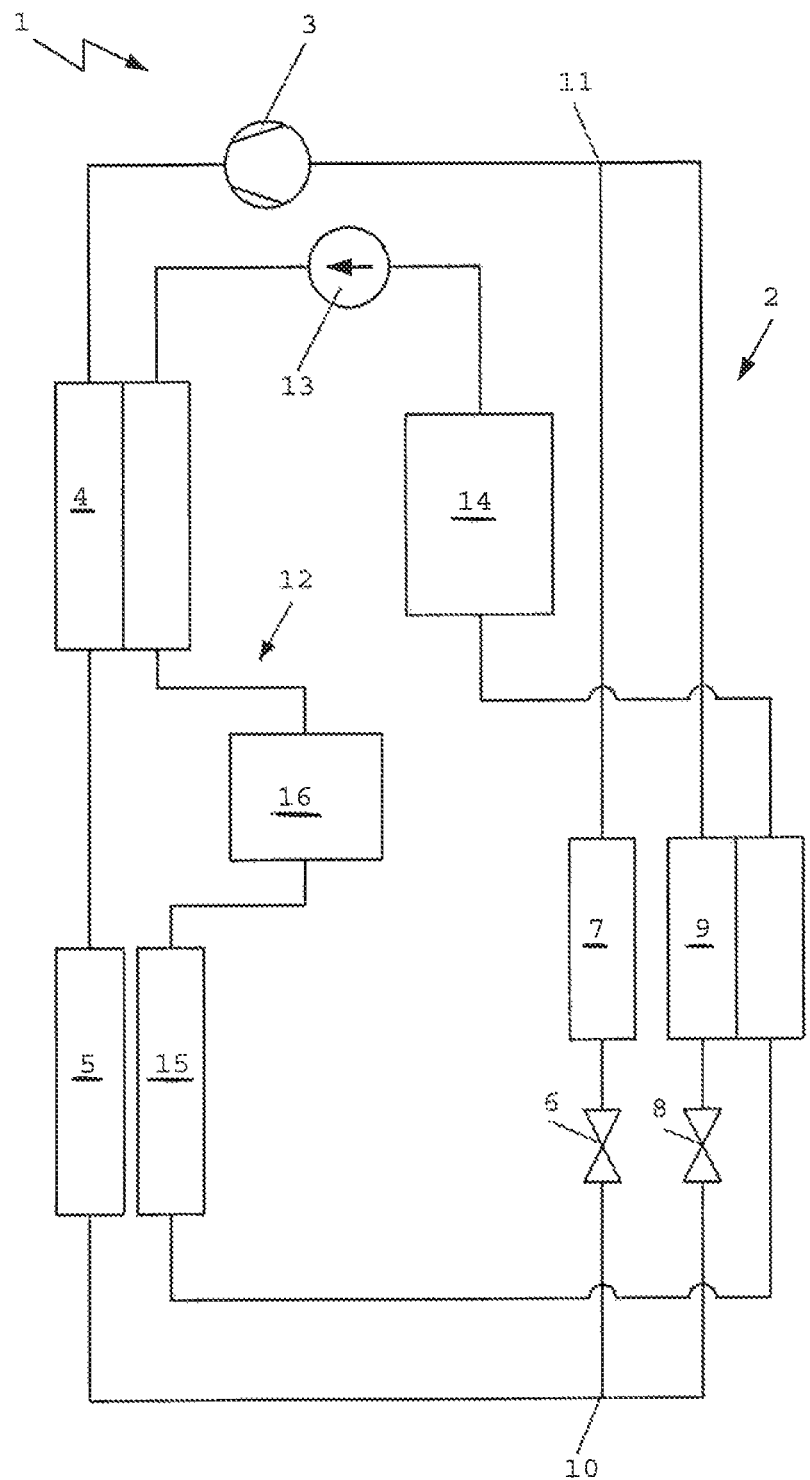

AC-SYSTEM WITH VERY HIGH COOLING CAPACITY

This application claims priority from German Patent Application No. 102016112095.2 filed on Jul. 1, 2016, which is hereby incorporated by reference in its entirety.

The invention relates to a system for climatizing the air of a passenger compartment and for the heat exchange with drive components of a motor vehicle. The system comprises a coolant circuit and a refrigerant circuit with a compressor, a refrigerant-air heat exchanger operated as condenser/gas cooler, at least one expansion element, at least one heat exchanger operated as evaporator for conditioning an air-mass flow to be supplied to the passenger compartment as well as at least one heat exchanger, operated as evaporator, for the heat transfer from the coolant to the refrigerant. The heat exchanger for conditioning the air-mass flow to be supplied to the passenger compartment is herein implemented as refrigerant-air heat exchanger. The heat exchanger for the heat transfer from the coolant to the refrigerant is disposed within the coolant circuit and is implemented as refrigerant-coolant heat exchanger.

Due to the implementation with additional components, such as high-volt batteries, internal charging apparatus, transformer, inverter as well as the electric motor, motor vehicles known within prior art with electric motor drive, referred to, in short, as electric vehicles, or motor vehicles with hybrid drive comprised of electric motor and combustion engine, referred to, in short, as hybrid vehicles, frequently have a higher refrigerating requirement than motor vehicles with pure combustion engine drive. Apart from the refrigerant circuit of the actual climatization system, conventional motor vehicles are implemented with a purely electric drive or an electric hybrid drive with a coolant circuit in which the circulating coolant for the discharge of the heat emitted by the drive components is conducted through an air-cooled heat exchanger.

In order to observe in particular the permitted temperature limits of a high-volt battery, which are conventionally between 20° C. and 35° C., for cooling the battery either the coolant circuit with an additional refrigerant-coolant heat exchanger for the thermal coupling with the refrigerant circuit of the climatization system or a directly refrigerant-cooled heat exchanger implemented as battery cooler is provided. The refrigerant-coolant heat exchanger, operated for the battery cooling as evaporator of the refrigerant, is also referred to as chiller.

DE 10 2009 002 424 A1 discloses a system for cooling the intake air for the passenger compartment of a motor vehicle as well as for cooling a battery. The system comprises a refrigerant circuit as well as at least one coolant circuit. The refrigerant circuit is herein implemented for the uptake of the heat from the coolant circuit. The coolant cooled in a refrigerant-coolant heat exchanger is conducted, for one, to a coolant-air heat exchanger disposed in an air conditioner. When flowing through the coolant-air heat exchanger the coolant is heated whereby the air to be supplied to the passenger compartment is cooled. For another, the coolant cooled in the refrigerant-coolant heat exchanger is conducted to the battery where it absorbs in a battery cooler the heat emitted by the battery. The coolant circuits of the coolant-air heat exchanger and of the battery cooler can be implemented separately of one another or as a common coolant circuit.

The automobile cooling systems known in prior art for electric vehicles are laid out for maximum refrigerating capacities in the range of 6 kW to 9 kW. However, future battery systems for electric vehicles and hybrid vehicles, in particular with quick charge technology of the battery, have refrigerating requirements in the range of 12 kW to 15 kW and therewith have very much higher refrigerating requirement than conventional electric vehicles and hybrid vehicles.

To provide comparable high refrigerating capacities, several different climatization systems for motor vehicles are known. Herein, for one, at least two compressors are operated in parallel in a conventional refrigerant circuit, such that the mass flow of the refrigerant is doubled or multiplied. On the other hand, at least two refrigerant circuits are implemented independently of one another, wherein each additional refrigerant circuit comprises additional components.

U.S. Pat. No. 7,228,707 B2 and US 2013/0145781 A1 describe each a refrigerant circuit with compressors disposed in parallel. The parallel compressors compress the refrigerant into a common pressure line which conducts the refrigerant to a heat exchanger operated as condenser.

The refrigerant circuit disclosed in U.S. Pat. No. 7,228,707 B2 in economizer connection comprises additionally a plurality of heat exchangers operated as evaporators, which serve for conditioning different environments. Each evaporator is herein connected with a compressor.

US 2013/0145781 A1 discloses a refrigerant circuit with two compressors wherein the first compressor operates under speed control and the second compressor is implemented to operate at fixed speed.

In the refrigerant circuits known in prior art the individual components, such as the heat exchanger operated as condenser/gas cooler, the refrigerant lines as connection lines between the components and the valves, must be dimensioned very large corresponding to the high maximum mass flow of the refrigerant.

Although individual flow paths, and therewith evaporators, can be shut off independently of one another, the evaporators can only be operated among one another as pressure-dependent evaporators. In simultaneous operation the evaporators can only highly elaborately be matched to one another even when using cost-intensive electric expansion valves.

While conventional cooling systems with refrigerant circuits with at least two compressors or known cascade systems provide higher refrigerating capacity, the transfer of the heat in the condenser/gas cooler as heat release from the refrigerant to the ambient air is very limited.

The system of a motor vehicle of prior art is only configured for the heat release in the range of 13 kW to 14 kW. However, providing a refrigerating capacity in the range of 12 kW to 15 kW requires at least a heat release of 20 kW on the high-pressure side of the refrigerant circuit.

Since, moreover, during the quick charge process of the battery the motor vehicle is not moving and therewith rests or rather is parked, the flow of the air for the action on the condenser/gas cooler in the front region of the motor vehicle has minimum speed. The ambient air is only transported by the ventilator associated with the condenser/gas cooler and is not additionally supported by the driving air speed, which, in turn, leads to a reduction of the heat release at the condenser/gas cooler.

The invention addresses the problem of providing a system with sufficient refrigerating capacity for motor vehicles with high cooling requirement, for example for motor vehicles with electric motor or combined electric motor and combustion engine drive.

Herein especially the heat release requirement for the high refrigerating capacities of at least 20 kW must be ensured at least for a limited period of time, for example during the quick charge process of the battery. The production, maintenance and operating costs as well as the requisite installation space should be minimal and the refrigerant circuit should be implemented of components dimensioned for conventional mass flows. The system should be operatable at high efficiency.

The problem is resolved through the subject matters with the features of the independent patent claims. Further developments are indicated in the dependent patent claims.

The problem is resolved through a system according to the invention for climatizing the air of a passenger compartment and for the heat exchange with drive components of a motor vehicle. The system comprises a coolant circuit and a refrigerant circuit with a compressor, a refrigerant-air heat exchanger operated as condenser/gas cooler, at least one expansion element, at least one heat exchanger operated as evaporator for conditioning an air-mass flow to be supplied to the passenger compartment, as well as at least one heat exchanger operated as evaporator for the heat transfer from the coolant to the refrigerant. The heat exchanger for the conditioning of the air-mass flow to be supplied to the passenger compartment is herein implemented as a refrigerant-air heat exchanger. The heat exchanger for the heat transfer from the coolant to the refrigerant is disposed within the coolant circuit and is implemented as refrigerant-coolant heat exchanger. The refrigerant circuit is thermally coupled with the coolant circuit across the refrigerant-coolant heat exchanger operated as evaporator.

According to the concept of the invention the refrigerant circuit comprises a heat exchanger, operated as condenser/gas cooler, which is implemented as refrigerant-coolant heat exchanger and is disposed within the coolant circuit for the heat transfer from the refrigerant to the coolant. The refrigerant circuit is therewith also thermally coupled across the refrigerant-coolant heat exchanger, operated as condenser/gas cooler, with the coolant circuit. The coolant circuit is moreover implemented with at least one heat exchanger for the heat exchange with a drive component.

If the liquefaction of the refrigerant takes place at subcritical operation, such as for example with the refrigerant R134a or at certain ambient conditions with carbon dioxide, the heat exchangers are denoted as condensers. A portion of the heat transfer takes place at constant temperature. At supercritical operation, or rather at supercritical heat release in the heat exchanger, the temperature of the refrigerant decreases continuously. In this case the heat exchanger is also referred to as gas cooler. Supercritical operation can occur under certain ambient conditions or operating modes of the refrigerant circuit, for example with the refrigerant carbon dioxide.

According to a further development of the invention the refrigerant-coolant heat exchanger operated as condenser/gas cooler for the heat transfer from the refrigerant to the coolant and the refrigerant-air heat exchanger for the heat transfer from the refrigerant to ambient air are disposed succeeding one another in the direction of flow of the refrigerant. The heat exchangers are connected in series. The refrigerant-air heat exchanger is disposed following the refrigerant-coolant heat exchanger in the direction of flow of the refrigerant.

The drive component is preferably an electric component, for example a high-volt battery or an electric motor, of an electric powertrain of the motor vehicle. The coolant circuit advantageously comprises a first heat exchanger for tempering the battery and a second heat exchanger for the heat exchange with the electric drive motor.

A particular advantage of the invention comprises that the first heat exchanger is disposed in the direction of flow of the coolant following the refrigerant-coolant heat exchanger, operated as evaporator, for the heat transfer from the coolant to the refrigerant and upstream of the refrigerant-coolant heat exchanger, operated as condenser/gas cooler, for the heat transfer from the refrigerant to the coolant and the second heat exchanger is disposed in the direction of flow of the coolant following the refrigerant-coolant heat exchanger, operated as condenser/gas cooler, for the heat transfer from the refrigerant to the coolant.

The coolant circuit is preferably implemented with a coolant-air heat exchanger for the heat transfer from the coolant to ambient air. The coolant-air heat exchanger is advantageously disposed in the direction of flow of the coolant between the second heat exchanger for the heat exchange with the drive motor and the refrigerant-coolant heat exchanger, operated as evaporator, for the heat transfer from the coolant to the refrigerant.

The ambient air can herein advantageously flow parallel or serially, that is sequentially, over the refrigerant-air heat exchanger of the refrigerant circuit operated as condenser/gas cooler, and the coolant-air heat exchanger of the coolant circuit. With the disposition of the refrigerant-air heat exchanger and of the coolant-air heat exchanger for serial action by the ambient air, the refrigerant-air heat exchanger is preferably disposed upstream of the coolant-air heat exchanger in the direction of flow of the ambient air.

The components, in particular the heat exchangers, of the coolant circuit are each disposed sequentially, and thus are connected in series. The heat exchangers are each preferably implemented such that the coolant flows directly through them successively. By direct successive disposition of the heat exchangers is to be understood that the heat exchangers are connected across a coolant line with one another, such that the coolant on the flow path between the heat exchangers does not pass through further components of the coolant circuit, in particular for the heat absorption or heat release by the coolant, with the exception of the appropriate connection line of, for example, a coolant pump.

According to a preferred embodiment of the invention the refrigerant circuit comprises at least two flow paths, each with a heat exchanger operated as evaporator and an expansion element preceding it in the direction of flow of the refrigerant. The flow paths are herein disposed parallel to one another and each can be acted upon by the refrigerant singly or in parallel depending on the requirement. The refrigerant-air heat exchanger operated as evaporator is disposed within the first flow path and the refrigerant-coolant heat exchanger operated as evaporator is disposed within the second flow path.

The problem is also resolved through a method according to the invention for operating the system for climatizing the air of a passenger compartment and for the heat exchange with drive components of a motor vehicle. The method comprises the following steps:

transfer of heat from a coolant circulating through a coolant circuit to a refrigerant circulating in a refrigerant circuit during the flow through a refrigerant-coolant heat exchanger operated as evaporator, wherein the coolant is cooled and the refrigerant evaporates, conduction of the cooled coolant to a first heat exchanger for the heat exchange with a first drive component, transfer of heat from the first drive component to the coolant during its flow through the first heat exchanger, wherein the coolant is heated and the first drive component is cooled, conduction of the coolant to a coolant-air heat exchanger, and transfer of heat from the coolant to the ambient air during the flow through the coolant-air heat exchanger, wherein the coolant is cooled.

According to a further development of the invention during its flow through the refrigerant-coolant heat exchanger, operated as evaporator, the coolant is cooled to a temperature below the temperature of the ambient air around the system.

According to an advantageous embodiment of the invention the coolant, after it flows out of the first heat exchanger for the heat exchange with the first drive component, or for tempering the first drive component, is conducted to a refrigerant-coolant heat exchanger operated as condenser/gas cooler. During the flow through the refrigerant-coolant heat exchanger heat is transferred from the refrigerant to the coolant, wherein the refrigerant is at least partially desuperheated or desuperheated and at least partially liquefied and the coolant is heated.

After it flows out of the refrigerant-coolant heat exchanger, operated as condenser/gas cooler, the refrigerant is preferably conducted to a refrigerant-air heat exchanger operated as condenser/gas cooler. During the flow through the refrigerant-air heat exchanger heat is transferred from the refrigerant to the ambient air, whereby the refrigerant is liquefied and, if required, subcooled.

A further preferred embodiment of the invention comprises that the heated coolant is conducted to a second heat exchanger for the heat exchange with a second drive component. During the flow through the second heat exchanger
- during operation of the system in a mode in which the heat absorbed by the system is greater than the heat transferable to the environment, heat is transferred from the coolant to the second drive component, whereby the coolant is cooled, as well as
- during operation of the system in a mode in which the heat transferable to the environment is greater than the heat absorbed by the system, heat is transferred from the second drive component to the coolant, whereby the coolant is heated and the second drive component is cooled.

According to a further development of the invention the coolant, after it has flown out of the first heat exchanger, is conducted through the refrigerant-coolant heat exchanger, operated as condenser/gas cooler, and subsequently through the second heat exchanger.

According to a preferred embodiment of the invention the air-mass flow to be supplied for the conditioning of a passenger compartment is conducted across a heat exchange surface of a refrigerant-air heat exchanger, operated as evaporator, of the refrigerant circuit, whereby the refrigerant evaporates with the absorption of heat.

The advantageous embodiment of the invention, in particular in view of the feasible storage of heat in a component of the powertrain, permits the use of the system in motor vehicles with electric motor drive or in motor vehicles with hybrid drive of electric motor and combustion engine.

In summary, the system according to the invention has diverse advantages:
- during the quick charge process of the battery adequate cooling of the battery can be ensured, which permits the application of the quick charge technology in electric vehicles,
- it is herein not required to discharge directly the entire refrigerating capacity of the system specifically during the quick charging of the battery at high ambient temperatures since a portion of the heat is stored intermediately, such that the heat-releasing surface of the entire system does not need to be enlarged as one of the basic limiting conditions for the attainable refrigerating capacity,
- thereby maximum efficiency of the system during operation and minimum installation space, as well as
- low cost in the production and maintenance as well as during operation.

The climatization system, in particular the refrigerant circuits are independent of the utilized refrigerant and therewith also laid out for R134a, R744, R1234yf or other refrigerants.

Further details, characteristics and advantages of embodiments of the invention are evident based on the following description of an embodiment example with reference to the associated drawing.

The [sole] FIGURE shows a system 1 of a motor vehicle with a refrigerant circuit 2 for conditioning the inflowing air of the passenger compartment and a coolant circuit 12 for the heat exchange with drive components, in particular for cooling the battery, of the motor vehicle. The refrigerant circuit 2 and the coolant circuit 12 are thermally coupled with one another.

The refrigerant circuit 2 comprises a compressor 3 for taking in and compressing the coolant. The compressed and superheated gaseous refrigerant is conducted to a first heat exchanger 4 operated as condenser/gas cooler. The first condenser/gas cooler is implemented as refrigerant-coolant heat exchanger 4. When flowing through the first condenser/gas cooler 4 the heat is transferred from the refrigerant to the coolant circulating in the coolant circuit 12. Depending on requirements and operating mode, the refrigerant is therein desuperheated and liquefied as well as, if required, subcooled. With the refrigerant-coolant heat exchanger 4 the refrigerant circuit 2 is thermally coupled with the coolant circuit 12.

After it exits the refrigerant-coolant heat exchanger 4, the refrigerant is conducted to a second heat exchanger 5 operated as condenser/gas cooler. The second condenser/gas cooler is implemented as refrigerant-air heat exchanger 5. During the flow through the second condenser/gas cooler 5 the heat is transferred from the refrigerant to the ambient air. Depending on the requirement and operating mode, the refrigerant is hereby desuperheated and liquefied as well as, if necessary, subcooled, for example if in the first condenser/gas cooler 4 no heat or very low heat is transferred. Otherwise the refrigerant is only liquefied in the refrigerant-air heat exchanger 5 and/or, if necessary, subcooled.

After it exits the refrigerant-air heat exchanger 5, the liquid refrigerant is divided at a branch site 10 onto two flow paths depending on requirements. Each flow path comprises an expansion element 6, 8 and a heat exchanger 7, 9 operated as evaporator. The mass subflows of the refrigerant conducted through the flow paths are combined again at a port site 11 and taken in by the compressor 3 as a common refrigerant mass flow. The refrigerant circuit 2 is closed. The two flow paths are herein, depending on requirements, acted upon individually or jointly and acted upon with refrigerant in parallel. The proportions of the mass flow can be between 0 and 100% depending on requirements.

The heat exchanger operated as evaporator of the first flow path with the expansion element 6 disposed upstream in the direction of flow of the refrigerant is implemented as refrigerant-air heat exchanger 7. The refrigerant evaporating during its flow through the refrigerant-air heat exchanger 7 absorbs the heat of the air-mass flow to be supplied to the passenger compartment. The air-mass flow is herein dehumidified and/or cooled.

The heat exchanger, operated as evaporator, of the second flow path with the second expansion element 8, precedingly disposed in the direction of flow of the refrigerant, is implemented as refrigerant-coolant heat exchanger 9. The refrigerant evaporating during its flow through the refrigerant-coolant heat exchanger 9 absorbs heat of the coolant circulating in the coolant circuit 12. The coolant is hereby cooled. With the refrigerant-coolant heat exchanger 9, which is also referred to as chiller, the refrigerant circuit 2 is thermally coupled with the coolant circuit 12.

Apart from the already described refrigerant-coolant heat exchanger 9, operated as evaporator in the refrigerant circuit 2, and the refrigerant-coolant heat exchanger 4, operated as condenser/gas cooler, the coolant circuit 12 comprises a coolant pump 13 for circulating the coolant and a coolant-air heat exchanger 15.

In the coolant circuit 12 implemented specifically for the heat exchange with drive components of the motor vehicle, furthermore is integrated a first heat exchanger 14 and a second heat exchanger 16. The first heat exchanger 14 is configured for tempering the battery, for example a high-volt battery. The second heat exchanger 16 serves for the heat exchange with the electric drive motor, denoted, in short, as motor.

The first heat exchanger 14 is disposed in the direction of flow of the coolant between the refrigerant-coolant heat exchanger 9, operated as evaporator, and the refrigerant-coolant heat exchanger 4, operated as condenser/gas cooler, or the coolant pump 13, while the second heat exchanger 16 is implemented in the direction of flow of the coolant between the refrigerant-coolant heat exchanger 4, operated as condenser/gas cooler, and the coolant-air heat exchanger 15.

The first heat exchanger 14 for the heat exchange with a drive component, the refrigerant-coolant heat exchanger 4, operated as condenser/gas cooler, the second heat 16 for the heat exchange with a drive component, the coolant-air heat exchanger 15 and the refrigerant-coolant heat exchanger 9, operated as evaporator, are each disposed one behind the other and thus are connected in series.

The coolant pump 13 transports the coolant from the refrigerant-coolant heat exchanger 9 of the refrigerant circuit 2 to the heat exchanger 14 for tempering the battery and through the refrigerant-coolant heat exchanger 4, in which the refrigerant can absorb heat from the coolant circuit 12, to the heat exchanger 16 for the heat exchange with the motor.

During the quick charge process of the battery of the electric powertrain of the motor vehicle with a requisite cooling requirement in the range of 12 kW to 15 kW, and in particular at simultaneously high temperatures of the ambient air of the system 1, a very large heat quantity must be discharged by the system 1. The quick charge process requires therefor a length of time in the range of 10 to 15 minutes.

In order not to have to discharge the very large heat quantity within the very short time of the duration of the quick charge process of the battery, which requires a very high heat capacity, a portion of the heat to be transferred to the ambient air can be stored intermediately. A suitable intermediate heat store is, for example, the electric drive motor, which can be heated to temperatures in the range of 60° C. to 80° C. and which has a large thermal mass and therewith a large thermal storage capacity. With the intermediate storage of the heat during the time of the charging during the quick charge process of the battery only a fraction of the heat emitted and to be output must be transmitted to the ambient air.

In particular at high temperature values of the ambient air during the quick charge process of the battery, the intermediate storage of the heat has a marked effect on the cooling capacity of the refrigerant circuit 2 for tempering, in particular for cooling, the battery or for conditioning the air-mass flow to be supplied to the passenger compartment.

With the simultaneous operation of system 1 in the quick charge process of the battery and in cooling system mode for climatizing the air-mass flow to be supplied to the passenger compartment, in particular for cooling and/or dehumidifying the air-mass flow, the mass flow of the refrigerant is divided at the branch site 10 of the refrigerant circuit 2, such that one mass subflow each of the refrigerant is conducted through the first and the second flow path.

The refrigerant conducted in the first flow path to the first expansion element 6 is expanded when flowing through the first expansion element 6 and is introduced into the evaporator 7 as a two-phase mixture. In the evaporation of the liquid fraction the refrigerant absorbs heat from the air-mass flow to be supplied to the passenger compartment and evaporates.

The refrigerant conducted in the second flow path to the second expansion element 8 expands during the flow through the second expansion element 8 and is introduced as a two-phase mixture into the evaporator 9. In the evaporation of the liquid fraction the refrigerant absorbs heat from the coolant. Herein the coolant is preferably cooled to a value of the temperature below the value of the temperature of the ambient air.

The mass subflows of the refrigerant conducted through the flow paths are subsequently again mixed at the port site 11 and taken in as a common mass flow by compressor 3 and compressed.

The coolant cooled during its flow through the evaporator 9 is subsequently conducted to the first heat exchanger 14 implemented for tempering the battery. In the heat transfer from the battery, emitting much heat and/or very strongly heated up during the quick charge process, to the coolant, the coolant is intensely heated. The discharge of the heat from the battery prevents the battery from being heated too intensely.

The coolant flowing out of the first heat exchanger 14 is subsequently conducted through the refrigerant-coolant heat exchanger 4 to the second heat exchanger 16 that is implemented for the heat exchange with the electric drive motor.

In particular at very high temperatures of the ambient air, for example at temperatures of approximately at least 40° C., the total required cooling capacity of the system 1, which is composed of the capacity for cooling the battery and the capacity for conditioning the air-mass flow to be supplied to the passenger compartment, increases markedly at constant size of the heat emitting surface of the total system.

Depending on the temperature of the battery or of the coolant after the heating of the coolant during its flow through the first heat exchanger 14, the heat is transferred from the superheated refrigerant to the coolant during the flow through the refrigerant-coolant heat exchanger 4. The refrigerant is herein at least partially or completely desuperheated and optionally at least partially liquefied while the coolant is heated further. In the refrigerant-coolant heat exchanger 4 the major portion of the heat to be discharged from the refrigerant is transferred to the coolant.

The coolant heated to a high temperature is cooled during its flow through the second heat exchanger 16, wherein the heat is transferred from higher tempered coolant to the motor and is stored as thermal mass in the motor. The coolant circuit 12 is herein controlled such that a predetermined maximum temperature of the motor is not exceeded.

The coolant subsequently flows through the coolant-air heat exchanger 15 whereby heat is transferred from the coolant to the ambient air. The at least precooled coolant is conducted back to the refrigerant-coolant heat exchanger 9 operated as evaporator.

The refrigerant at least partially desuperheated or completely desuperheated and optionally at least partially liquefied during its flow through the refrigerant-coolant heat exchanger 4, operated as condenser/gas cooler, is conducted to the refrigerant-air heat exchanger 5. In the refrigerant-air heat exchanger 5 heat is transferred from the refrigerant to the ambient air. Since in the refrigerant-coolant heat exchanger 4 a major portion of the heat to be discharged from the refrigerant, especially the heat for desuperheating of the gaseous superheated refrigerant, had already been transferred to the coolant, the condenser/gas cooler 5 can be operated with efficient heat transfer between the refrigerant and the ambient air at a lower intake temperature of the refrigerant.

The desuperheated and liquefied, as well as optionally subcooled, refrigerant flowing out of the condenser/gas cooler 5 is conducted to the branch site 10.

With simultaneous operation of system 1 in quick charge process of the battery and in cooling system mode for climatizing the air-mass flow to be supplied to the passenger compartment, the heat emitted by the battery during the quick charge process is absorbed by the coolant. The heat discharged from the air-mass flow to be supplied to the passenger compartment is absorbed by the refrigerant and, in addition to the heat supplied in compressor 3 to the refrigerant, transferred proportionately to the coolant and the ambient air. The heat discharged to the coolant is again proportionately transferred to the motor as a heat store, to the ambient air and the refrigerant.

During the exclusive operation of system 1 during the quick charge process of the battery, that is without the operation in cooling system mode for the climatization of the air-mass flow to be supplied to the passenger compartment, the refrigerant circulating in the refrigerant circuit 2 flows exclusively from the branch site 10 into the second flow path to the second expansion element 8, expands during its flow through the second expansion element 8 and is introduced as two-phase mixture into the evaporator 9. During evaporation of the liquid fraction the refrigerant absorbs again heat from the coolant. The coolant is herein preferably cooled to a value of the temperature below the value of the temperature of the ambient air. In contrast to the simultaneous operation of system 1 in quick charge process of the battery and in cooling system mode for climatizing the air-mass flow to be supplied to the passenger compartment, the first flow path is closed.

The heat discharged in evaporator 9 from the coolant to the refrigerant, in addition to the heat transferred in compressor 3 to the refrigerant, is in condenser/gas cooler 4 at least proportionately again discharged to the coolant. With the coolant cooled in evaporator 9 it is possible to absorb the heat emitted by the battery. The fraction of the heat not transferred in the condenser/gas cooler 4 from the refrigerant to the coolant is transferred in the condenser/gas cooler 5 to the ambient air.

The heat emitted by the battery during the quick charge process is transferred in the first heat exchanger 14 to the coolant and from the coolant proportionately in the second heat exchanger 15 transferred to the ambient air and in the refrigerant-coolant heat exchanger 9, operated as evaporator, to the refrigerant.

After termination of the operation of the quick charge process of the battery, the heat to be transferred from the battery to the coolant decreases, such that at constant or greater discharged heat of system 1 to the environment the coolant is conducted at lower temperature to the second heat exchanger 16 and the motor serving as a heat store can be cooled again.

The coolant, having, in comparison to the operation of system 1 during a quick charge process of the battery, a lower temperature than the motor, is further heated during its flow through the second heat exchanger 16. The heat is herein transferred from the higher tempered motor to the coolant whereby also the heat, stored in the motor during operation of system 1 during the quick charge process of the battery, is discharged again.

The heat stored in the motor during the quick charge process of the battery is discharged during the driving of the motor vehicle, and therewith at a later point in time than the quick charge process of the battery, via the coolant circuit 12 and the coolant-air heat exchanger 15 to the ambient air.

Through the driving of the motor vehicle and therewith an improved ambient air-mass flow to the refrigerant-air heat exchanger 5 and coolant-air heat exchanger 15, disposed in the front region of the motor vehicle, compared to the stationary state of the motor vehicle, the heat transfer and therewith the heat capacities of the refrigerant-air heat exchanger 5 and of the coolant-air heat exchanger 15 are simultaneously increased. More heat is transferred from system 1 to the ambient air.

LIST OF REFERENCE NUMBERS

1 System
2 Refrigerant circuit
3 Compressor
4 Refrigerant-coolant heat exchanger, condenser/gas cooler
5 Refrigerant-air heat exchanger, condenser/gas cooler
6 First expansion element
7 Refrigerant-air heat exchanger, evaporator
8 Second expansion element
9 Refrigerant-coolant heat exchanger, evaporator
10 Branch site
11 Port site
12 Coolant circuit
13 Coolant pump
14 First heat exchanger driver component, battery
15 Coolant-air heat exchanger
16 Second heat exchanger drive component, motor

The invention claimed is:

1. A system for climatizing the air of a passenger compartment and for the heat exchange with drive components of a motor vehicle, comprising
a coolant circuit and
a refrigerant circuit with a compressor, a refrigerant-air heat exchanger operated as condenser/gas cooler, at least one expansion element, at least one heat exchanger, operated as evaporator, for conditioning an air-mass flow to be supplied to the passenger compartment, which is implemented as refrigerant-air heat exchanger, as well as at least one heat exchanger, operated as evaporator, which is implemented as a first refrigerant-coolant heat exchanger and is disposed within the coolant circuit for the heat transfer from the coolant to the refrigerant,
wherein the refrigerant circuit comprises a heat exchanger, operated as condenser/gas cooler, which is implemented as a second refrigerant-coolant heat exchanger and is disposed within the coolant circuit for the heat transfer from the refrigerant to the coolant, and
wherein that the coolant circuit has a coolant therein and further comprises a first heat exchanger which cools a battery, a second heat exchanger which exchanges heat from an electric drive motor to the coolant, a coolant pump, and a coolant-air heat exchanger for conditioning an air-mass flow to be supplied to the passenger compartment, wherein the first heat exchanger is disposed in the direction of flow of the coolant between the first refrigerant-coolant heat exchanger and the coolant pump,
and wherein the second heat exchanger is disposed in the direction of flow of the coolant between the second refrigerant-coolant heat exchanger and the coolant-air heat exchanger.

2. A system as in claim 1, wherein the second refrigerant-coolant heat exchanger, operated as condenser/gas cooler, and the refrigerant-air heat exchanger, operated as condenser/gas cooler, are disposed successively in the direction of flow of the refrigerant.

3. A system as in claim 1, wherein the refrigerant circuit comprises at least two flow paths, each with one heat exchanger operated as an evaporator and one preceding expansion element in the direction of flow of the refrigerant, wherein
the flow paths are disposed in parallel and, depending on requirements, can be acted upon individually or parallel by the refrigerant, and
the refrigerant-air heat exchanger, operated as evaporator, is disposed within the first flow path; and
wherein the first refrigerant-coolant heat exchanger, operated as evaporator, is disposed within the second flow path.

4. A motor vehicle comprising an electric motor drive or a hybrid drive comprising an electric motor and combustion engine, further comprising the system as in claim 1.

5. A system as in claim 1, wherein the battery has a requisite cooling requirement in the range of 12 kW to 15 kW during a quick charge process.

6. A system as in claim 1, further comprising a branch site, wherein after exiting the refrigerant-air heat exchanger, the liquid refrigerant is divided at the branch site onto two flow paths.

7. A system as in claim 1, wherein the first heat exchanger exchanges heat from the battery to the coolant.

8. A system as in claim 7, wherein the first heat exchanger is disposed succeeding the first refrigerant-coolant heat exchanger, operated as evaporator, and preceding the second refrigerant-coolant heat exchanger operated as condenser/gas cooler and that the second heat exchanger is disposed, in the direction of flow of the coolant, succeeding the second refrigerant-coolant heat exchanger operated as condenser/gas cooler.

9. A method for operating the system as in claim 1, comprising the steps of:
transferring heat from the coolant circulating through the coolant circuit to the refrigerant circulating in the refrigerant circuit during flow of the refrigerant through the first refrigerant-coolant heat exchanger,
transferring heat from the first drive component to the coolant during the coolant flow through the first heat exchanger, whereby the coolant is heated and the first drive component is cooled, and
transferring heat from the coolant to ambient air during the coolant flow through a coolant-air heat exchanger, whereby the coolant is cooled.

10. A method as in claim 9, wherein the coolant, after the coolant flows out of the first heat exchanger is conducted to the second refrigerant-coolant heat exchanger, of the refrigerant circuit and that during flow of the coolant through the second refrigerant-coolant heat exchanger heat is transferred from the refrigerant to the coolant, whereby the refrigerant is at least partially or completely desuperheated and at least partially liquefied and the coolant is heated.

11. A method as in claim 9, wherein a portion of the heat to be transferred to the environment can be stored intermediately.

12. A method as in claim 9, wherein through the driving of the motor vehicle and therewith an improved ambient air-mass flow to the refrigerant-air heat exchanger and coolant-air heat exchanger, disposed in the front region of the motor vehicle, compared to the stationary state of the motor vehicle, the heat transfer and therewith the heat capacities of the refrigerant-air heat exchanger and of the coolant-air heat exchanger are simultaneously increased.

13. A method as in claim 9, wherein after termination of the operation of a quick charge process of the battery, the heat to be transferred from the battery to the coolant decreases, such that at constant or greater discharged heat of the system to the environment the coolant is conducted at lower temperature to the second heat exchanger; and
wherein a motor of a motor vehicle serving as a heat store is cooled again.

14. A method as in claim 9, wherein the heated coolant is conducted to a second heat exchanger for the heat exchange with a second drive component, and that during the flow through the second heat exchanger
during operation of the system in a mode in which the heat absorbed by the system is greater than that transferable to the environment, heat is transferred from the coolant to the second drive component, whereby the coolant is cooled, and
during operation of the system in a mode in which the heat transferable to the environment is greater than that absorbed by the system, heat is transferred from the second drive component to the coolant, whereby the coolant is heated and the second drive component is cooled.

15. A method as in claim 14, wherein after the coolant flows out of the first heat exchanger the coolant is conducted through the second refrigerant-coolant heat exchanger, operated as condenser/gas cooler, of the refrigerant circuit and subsequently through the second heat exchanger.

16. A method as in claim 9, wherein the method takes place during a quick charge process of the battery.

17. A method as in claim 16, wherein the battery has a requisite cooling requirement in the range of 12 kW to 15 kW during the quick charge process.

18. A method as in claim 16, wherein heat stored in a motor of a motor vehicle created during the quick charge process of the battery is discharged during driving of the motor vehicle.

* * * * *